United States Patent [19]

Inoue

[11] 4,439,660
[45] Mar. 27, 1984

[54] ELECTROEROSIVE CONTOUR-MACHINING METHOD AND APPARATUS WITH A ROTARY TOOL ELECTRODE

[75] Inventor: Kiyoshi Inoue, Tokyo, Japan

[73] Assignee: Inoue-Japax Research Incorporated, Yokohama, Japan

[21] Appl. No.: 345,050

[22] Filed: Feb. 2, 1982

[30] Foreign Application Priority Data

Feb. 3, 1981 [JP] Japan .................................. 56-13829

[51] Int. Cl.³ .............................................. B23P 1/12
[52] U.S. Cl. ............................ 219/69 M; 204/129.55; 204/212; 219/69 E; 219/69 V
[58] Field of Search ............... 219/69 E, 69 V, 69 M; 204/224 M, 129.55, 212

[56] References Cited

U.S. PATENT DOCUMENTS

| 3,363,083 | 1/1968 | O'Conner | 219/69 E |
| 3,591,761 | 7/1971 | Bederman et al. | 219/69 V |
| 4,096,371 | 6/1978 | Lozon | 219/69 E |

FOREIGN PATENT DOCUMENTS

| 791014 | 2/1958 | United Kingdom . |
| 850284 | 10/1960 | United Kingdom . |
| 954348 | 4/1964 | United Kingdom . |
| 968508 | 9/1964 | United Kingdom . |
| 1018721 | 2/1966 | United Kingdom . |
| 1532781 | 11/1978 | United Kingdom . |
| 1564350 | 4/1980 | United Kingdom . |
| 1597590 | 9/1981 | United Kingdom . |

Primary Examiner—B. A. Reynolds
Assistant Examiner—Alfred S. Keve
Attorney, Agent, or Firm—Karl F. Ross; Herbert Dubno

[57] ABSTRACT

An improved method of electroerosively machining a two- or three-dimensional contour in a workpiece makes use of a worktable movable to displace the workpiece in an X-Y plane and a tool electrode having a plurality of divided machining electrode surfaces on its lateral periphery. The tool electrode is supported with a support member so as to be rotatable about a rotary axis orthogonal to the X-Y plane and so that each of the machining surfaces extends in parallel with the rotary axis. Motors for translational movement of the worktable and a motor for rotating the tool electrode are controlled by a command source, e.g. NC unit, to control the position of the workpiece and the angular orientation of the tool electrode so that the particular machining surfaces optimum to the particular configurations of successive portions of the contour that are to develop sequentially in the workpiece are presented in machining relationship with the workpiece.

2 Claims, 5 Drawing Figures

ELECTROEROSIVE CONTOUR-MACHINING METHOD AND APPARATUS WITH A ROTARY TOOL ELECTRODE

FIELD OF THE INVENTION

The present invention relates to a machining process and apparatus and, more particularly, to a new and improved method of and apparatus for electroerosively machining a two- or three-dimensional contour in a workpiece with a rotatable tool electrode.

BACKGROUND OF THE INVENTION

A two- or three-dimensional contour has hitherto been machined electroerosively in a workpiece by preparing a tool electrode so shaped as to be complementary with the desired contour and advancing or "sinking" the tool electrode in a given direction progressively into the workpiece while an electroerosion machining current is passed between the tool electrode and the workpiece. An intricate contour may also be machined electroerosively in a workpiece with a simple solid electrode by controlling machining feed to displace the tool electrode relative to the workpiece along a sequence of displacement paths. In this latter process, the tool electrode need not be shaped to be complementary to the desired two- or three-dimensional contour and the workpiece is supported on a movable worktable to lie in a horizontal or X-Y plane. During the machining operation, the worktable is driven horizontally to displace the workpiece along X- and Y-coordinate axes or, further, vertically to displace the workpiece along a Z-coordinate axis orthogonal to the X-Y plane, relative to the tool electrode fixed in position, so that the desirable two- or three-dimensional contour determined by eventual paths of relative displacement is formed in the workpiece. While this process in eliminating the need for the laborious, time-consuming and costly job of shaping a particular electrode tool complementary to each individual contour desired, offers greater advantages over the sinking-type process, it has been found to be often defective in achieving the desired contour with due precision and finish, especially at corner or angular portions thereof, thus necessitating a further finishing operation with a replaced electrode tool.

OBJECTS OF THE INVENTION

It is, accordingly, an important object of the present invention to provide an improved method of electroerosively machining a contour by effecting machining feed multi-dimensionally, which method allows the desired contour to be machined with due precision and finish, yet with an increased efficiency over the conventional process.

Another important object of the invention is to provide an improved electroerosion machining apparatus suitable for carrying out the improved method.

SUMMARY OF THE INVENTION

In accordance with the present invention, in a first aspect thereof, there is provided a method of electroerosively machining a contour in a workpiece, which method comprises the steps of: (a) supporting the workpiece on a movable worktable to lie in an X-Y plane; (b) supporting a tool electrode having on its lateral periphery a plurality of divided machining electrode surfaces with a tool support so that each of the divided machining surfaces extends orthogonally to the X-Y plane and the tool electrode is rotatable about an axis extending in parallel with the said surfaces; (c) positioning the tool electrode by rotating the tool support about the said axis to establish a predetermined angular orientation of the tool electrode from a predetermined angular position whereby at least a portion of the electrode surfaces is brought into a machining relationship with the workpiece; (d) electroerosively removing material from a portion of the workpiece juxtaposed with the said portion of the electrode surfaces while moving the worktable to displace the workpiece in the X-Y plane so that the said portion of the surfaces moves along a portion of the contour in the workpiece; (e) angularly repositioning the tool electrode through rotation of the tool support about the said axis to alter angular orientation of the tool electrode whereby at least another portion of the electrode surfaces is brought into a machining relationship with the workpiece, and effecting step (d) with respect to said other portion of the surfaces so that the latter moves along a subsequent portion of the contour in the workpiece; and (f) repeating step (e) to sequentially machine successive portions of the contour in the workpiece.

The invention also provides, in a second aspect thereof, an apparatus for electroerosively machining a contour in a workpiece, which apparatus comprises: a movable worktable for securely mounting the workpiece thereon in an X-Y plane; a first and second motor means drivingly coupled with said worktable for displacing said workpiece along an X- and Y- coordinate axes, respectively; a tool electrode having on its lateral periphery a plurality of divided machining electrode surfaces; a tool support for securely supporting said tool electrode therewith so that each of the machining electrode surfaces extends orthogonally to the X-Y plane and the tool electrode is rotatable about an axis extending therethrough in parallel with the said surfaces; a third motor means drivingly coupled with the tool support for rotating the tool electrode about the said axis; power supply means for passing an electroerosion machining current between the tool electrode and the workpiece; and drive control means for the said first, second and third motor means. Specifically, the drive control means furnishes a sequence of rotary drive signals, each of the rotary drive signals being furnished to the third motor means for rotating the tool support about the said axis to establish a predetermined angular orientation of the tool electrode from a predetermined angular position thereof about the said axis whereby at least a portion of the said electrode surfaces is brought into a machining relationship with the workpiece. The drive control means furnishes a sequence of translational drive signals, each of the translational drive signals being furnished to the said first and second motor means for displacing the workpiece in the X-Y plane while material is electroerosively removed from a portion of the workpiece juxtaposed with the said portion of the electrode surfaces with the machining current passed from the said power supply means so that the said portion of the machining surfaces move along a portion of the said contour and the workpiece, the said drive control means being operative to apply each of the said rotary drive signals and each of the said translational drive signals to the said third motor means and the said first and second motor means to sequentially machine successive portions of the said contour in the workpiece.

BRIEF DESCRIPTION OF THE DRAWING

These and other objects and features of the present invention as well as advantages thereof will become more readily apparent from the following description taken with reference to the accompanying drawing in which.

SPECIFIC DESCRIPTION

Figure 1:
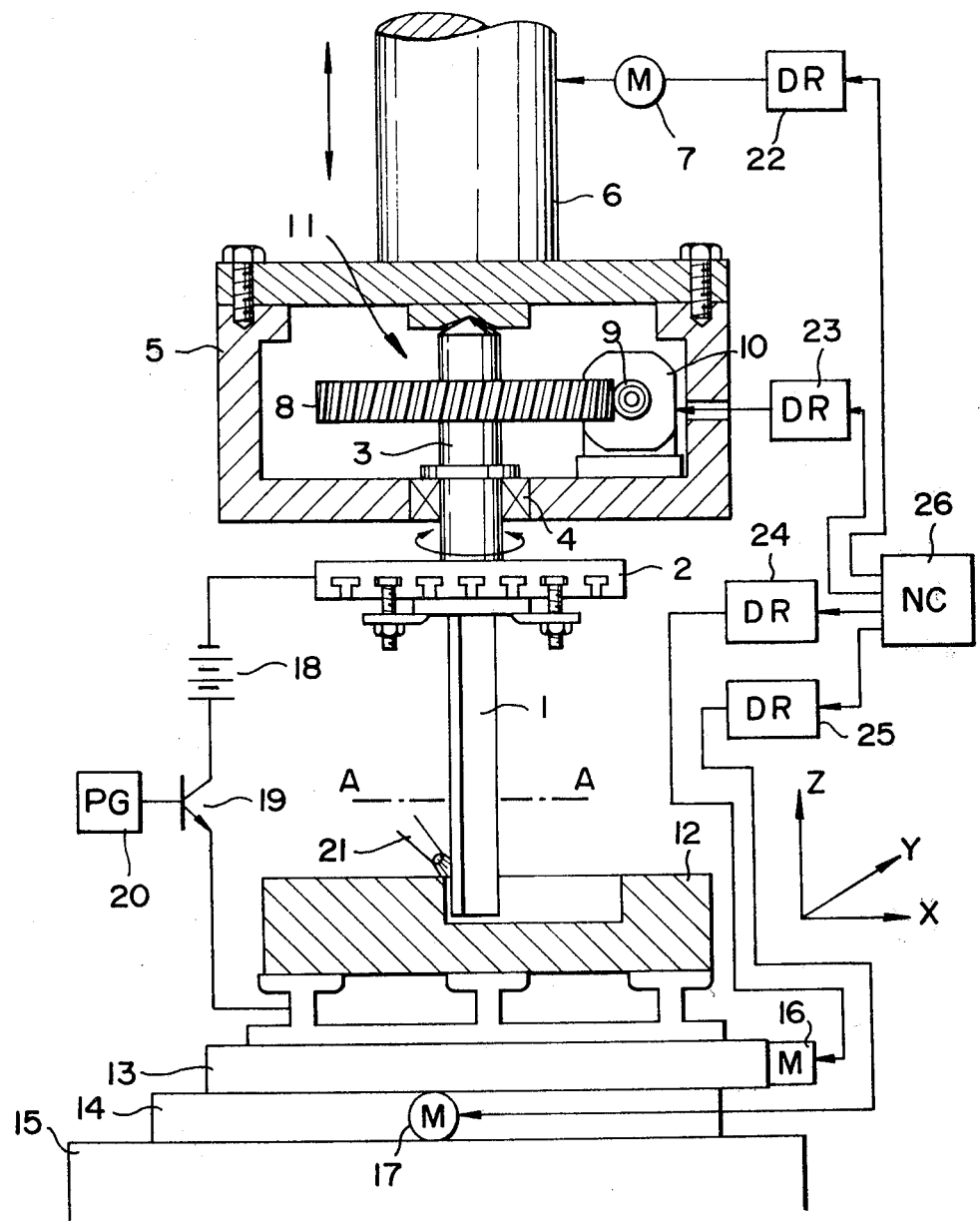
FIG. 1 is a front view, partly in section and partly in a block diagram form, illustrating an apparatus according to the invention.

In the apparatus of FIG. 1, a tool electrode 1 is securely supported by a tool holder 2 which is in turn securely supported by a rotary shaft 3 so that the tool electrode 1 and the shaft 3 are coaxial with each other. The shaft 3 is rotatably supported on a bearing 4 provided through a casing 5 which is securely supported by a spindle 6 of an electrical discharge machining (EDM) apparatus. The tool electrode 1 and the spindle 6 are arranged to be coaxial with each other. The spindle 6 is driven by a motor 7, e.g. a stepping motor, so as to be movable vertically or along a Z-axis to adjust and control the vertical position of the tool electrode 1.

In the casing 6, the shaft 3 has a worm wheel 8 secured thereto in mesh with a worm 9 securely mounted on the drive shaft of a motor 10, e.g. stepping motor. The motor 10 is received, together with the worm wheel 8 and worm 9, in the casing 5 to constitute a rotary unit 11 for the shaft 3 and the tool electrode 1.

The tool electrode 1 is shown in a position for machining a workpiece 12 securely supported on a worktable assembly comprising a pair of movable tables 13 and 14 in a cross slide arrangement on a machine bed 15. The tables 13 and 14 have motors 16 and 17, e.g. stepping motors, drivingly coupled thereto for displacing the workpiece 12 along an X-axis and Y-axis, respectively, which are orthogonal to each other and to the Z-axis. The workpiece 12 is thus arranged to be displaceable in the horizontal X-Y plane orthogonal to the axis of the tool electrode 1 and the spindle 6.

The electroerosion machining power supply may comprise a DC source 18 shown connected electrically on one hand to the tool electrode 1 via the electrically conductive tool support 2 and on the other hand to the workpiece 12 in series with a switching transistor 19. The latter is energized by a succession of signal pulses furnished from a signal pulse generator 20 to pulse the DC output of the source 18 and thereby to apply a succession of machining pulses across the tool electrode 1 and the workpiece 12. An electroerosion machining liquid medium, e.g. distilled water, into the machining gap between the tool electrode 1 and the workpiece 12 is shown supplied by means of a nozzle 21 but may be furnished through an internal bore in the tool electrode 1 or by immersing the machining region in the liquid medium as is well known in the art.

The motors 7, 10, 16 and 17 are energized by respective driver circuits 22, 23, 24 and 25 which are furnished with respective drive signals from a command source, e.g. a numerical control (NC) unit 26 which stores these signals preprogrammed.

Figure 2:
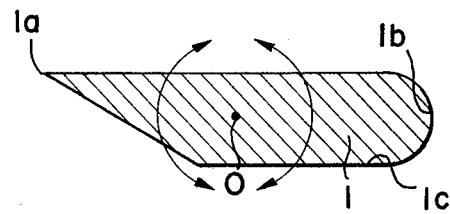
FIG. 2 is a sectional view of a tool electrode having a plurality of divided machining electrode surfaces on its lateral periphery for use with the apparatus of FIG. 1 and in carrying out the method of the invention.

FIG. 2 shows an exemplary form of the tool electrode 1 for use with the apparatus of FIG. 1 in carrying out the method of the invention. The tool electrode 1 shown has a plurality of divided machining electrode surfaces 1a, 1b and 1c on its lateral periphery and is rotatable about its axis O by the rotary mechanism 11. These surfaces are arranged to be orthogonal to the X-Y plane in which the workpiece 12 lies. It is seen that the surface 1a is angular or pointed, the surface 1b is rounded and the surface 1c is planar.

Figure 3:
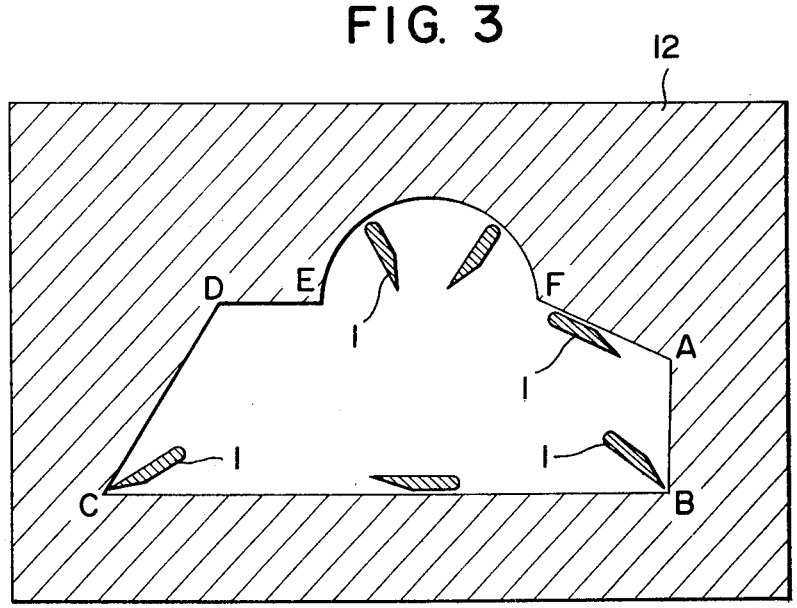
FIG. 3 is a sectional view, taken along the line A—A of FIG. 1 and viewed from top, diagrammatically illustrating the tool electrode of FIG. 2 while in several positions with respective angular orientations for machining a contour in a workpiece.

FIG. 3 shows a machining example in which a contour defined by a plurality of sections AB, BC, CD, DE and EF is to be formed in the workpiece 12 with the tool electrode 1 of FIG. 2 according to the method of the invention. The electrode 1 is shown taking particular orientations depending on the particular portions, viz. corner B, plane BC, corner C, arcuate area EF and plane FA of the entire contour to be machined in the workpiece 12. Thus, in machining planar sections FA, BC, CD and DE of the contour, the tool electrode 1 is rotated to establish particular angular orientations whereby to present the machining surface 1c to move along these planes while holding these respective angular orientations. The movement is effected by displacing the workpiece 12 relative to the axis of the tool electrode 1 fixed in position. In machining the arcuate portion EF, the tool electrode 1 is rotated to present the machining surface 1b to move along the arc EF. Then, optionally, the angular position of the tool 1 is controlled so that it lies always orthogonal to the tangential to the arc EF as shown. In machining angular or corner portions A, B, C, and D, the tool electrode 1 is rotated to present the machining surfaces 1a etc. to move along a contour around each of these portions. In this manner, particular machining surfaces optimum to particular configurations of successive portions of the contour which are to develop sequentially are presented, through rotations of the tool electrode, in machining relationship with the workpiece to accomplish a given contour-machining operation with an extremely high efficiency. Inclusion of the surface 1c of a relatively large area to machine a straight section of the contours allows large machining current to be delivered and thus enables fast material removal. The use of an angular or pointed surface 1a to machine a corner or angular portion of the contour enables extremely accurate shaping. Machining efficiency is further enhanced by the fact that no replacement of the tool electrode is required.

Specifically, let us assume, for example, that machining commences at section FA. The command source 26 furnishes the driver circuit 23 for the motor 9 with a drive signal to rotate the tool electrode 1 until a predetermined angular orientation as shown is reached. The command source 26 also furnishes the driver circuits 24 and 25 for the motors 16 and 17 with drive signals to position the workpiece 12 in the X-Y plane and the driver circuit 22 for the motor 7 to vertically advance the tool electrode 1. The vertical advance of the tool electrode 1 may be continued while the electroerosion machining current is passed between the electrode 1 and the workpiece 12 until the tool electrode 1 reaches a predetermined machining depth. The command source 26 then furnishes the driver circuits 24 and 25 for the motors 16 and 17 with drive signals to displace the workpiece 12 so that the machining surface 1c of the tool electrode 1 moves along the straight path FA. This movement is continued until the tool electrode 1 approaches the corner A. The command source 26 may then furnish the driver circuit 23 for the motor 10 with a rotary drive signal to rotate the tool electrode 1 and the driver circuits 24 and 25 for the motors 16 and 17 with translational drive signals so that the tool electrode 1 swings in the vicinity of the corner A and the pointed portion 1a moves around the corner A. When material removal around the corner A is finished, the tool electrode 1 must be angularly repositioned. The command source 26 then furnishes the driver circuit 23 for the motor 10 with a rotary drive signal to alter the angular orientation of the tool electrode 1 and the driver circuits 24 and 25 for the motors 16 and 17 with drive signals such that the machining surface 1c comes closer in alignment with the next path AB. The workpiece 12 continues to be displaced so that the surface 1c moves along the path AB until the tool electrode 1 approaches the corner B. In this manner, successive portions of the contour, path FA, corner A, path AB, corner B, path BC ... are sequentially machined.

A three-dimensional contour may be machined by increasing the depth of the tool electrode successively in the workpiece 12. Thus, upon completing each two-dimensional contouring operation to form a two-dimensional contour so far described, the tool electrode 1 is advanced into the workpiece 12 by a predetermined depth or increment and another two-dimensional contouring operation may follow to form another two dimensional contour; this operation proceeds until a desired three-dimensional contour is formed in the workpiece. The command source 26 is preprogrammed with respective drive signals for the motors 7, 10, 16 and 17 to achieve the horizontal movements of the workpiece 12 and the rotary and vertical movements of the tool electrode 1.

Figure 4:
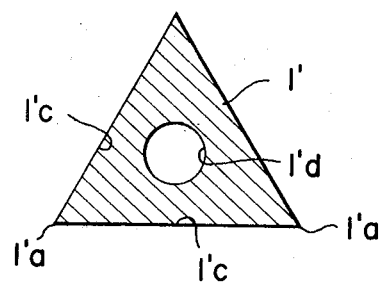
FIGS. 4 and 5 are sectional views illustrating further forms of the tool electrode of the invention for use with the apparatus of FIG. 1.
Figure 5:
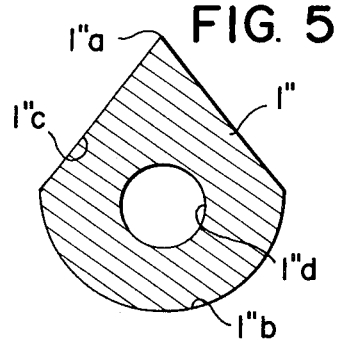

FIGS. 4 and 5 show different forms of the tool electrode which may be used with the apparatus of FIG. 1 and in carrying out the method of the invention. Each of the electrodes 1' and 1" shown is formed with a central bore 1'd, 1"d constituting a passage for the machining liquid medium. The tool electrode 1' shown in FIG. 4 is triangular in cross section having apex portions 1'a suitable for machining a corner portion and planar portions 1'c to move along a straight section of the contour to be formed in the workpiece. When one apex portion 1'a is worn, another apex portion can advantageously be presented, by rotation of the tool electrode 1', in juxtaposition with a subsequent corner portion of the contour. The tool electrode 1" shown in FIG. 5 includes one apex portion 1"a and two planar portions 1"c defining the apex 1"a and further is formed with an arcuate machining surface 1"b.

What is claimed is:

1. A method of electroerosively machining a contour in a workpiece, comprising the steps of:
    (a) supporting said workpiece on a movable worktable to lie in an X-Y plane,
    (b) supporting a tool electrode having on its lateral periphery a plurality of divided machining electrode surfaces with a tool support so that each of said divided machining surfaces extends orthogonal to said X-Y plane and said tool electrode is rotatable about an axis extending in parallel with said surfaces;
    (c) positioning said tool electrode by rotating said tool support about said axis to establish a predetermined angular orientation of the tool electrode relative to a predetermined angular position whereby at least a portion said electrode surfaces is brought into a machining relationship with said workpiece;
    (d) electroerosively removing material from at least a portion of said workpiece juxtaposed with said portion of said surfaces while moving said worktable to displace said workpiece in said X-Y plane so that said portion of the electrode surfaces moves along a portion of said contour in said workpiece;
    (e) angularly repositioning said tool electrode through rotation of said tool support about said axis to alter angular orientation of said tool electrode whereby at least another portion of said surfaces is brought into a machining relationship with said workpiece, and effecting step (d) so that said other portion of the electrode surfaces moves along a subsequent portion of said contour in said workpiece; and
    (f) repeating step (e) to sequentially machine successive portions of said contour in said workpiece.

2. An electroerosive machining apparatus comprising:
    a movable worktable for securely mounting a workpiece thereon in an X-Y plane for electroerosively machining contour in the workpiece;
    a first motor means drivingly coupled with said worktable for displacing the workpiece in said X-Y plane;
    a tool electrode having a plurality of divided machining electrode surfaces on its lateral periphery;
    a tool support for securely supporting the tool electrode so as to be rotatable about a rotary axis orthogonal to said X-Y plane and so that each of said dividing machining surfaces extends parallel to said rotary axis;
    a second motor means for rotating said tool electrode about said rotary axis;
    power supply means for passing an electroerosion machining current between said tool electrode and said workpiece; and
    a drive control means for said first and second motor means for
    positioning said tool electrode by rotating said tool support about said axis to establish a predetermined angular orientation of the tool electrode relative to a predetermined angular position to bring at least a portion of one of said electrode surfaces into a machining relationship with said workpiece, thereby enabling electroerosive removal of material from at least a portion of said workpiece juxtaposed with said portion of said one of said surfaces while moving said worktable to displace said workpiece in said plane so that said portion of said one of said surfaces moves along a portion of said contour in said workpiece, and
    rotating said tool support about said axis by a portion of a full rotation to angularly reposition said tool electrode and to selectively bring another portion of another of said workpieces into machining relationship with said workpiece and moving said other portion along a subsequent portion of said contour in said workpiece.

* * * * *